Oct. 11, 1927.
G. RATHMAN
1,645,349
SCREW PUMP
Filed Oct. 10, 1924
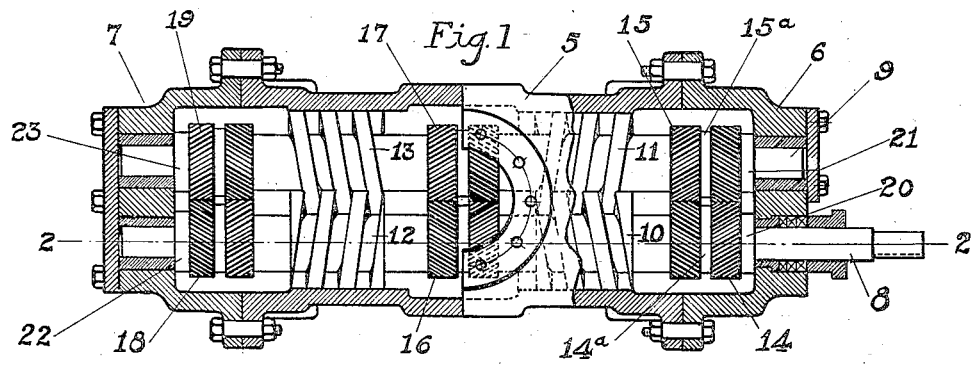
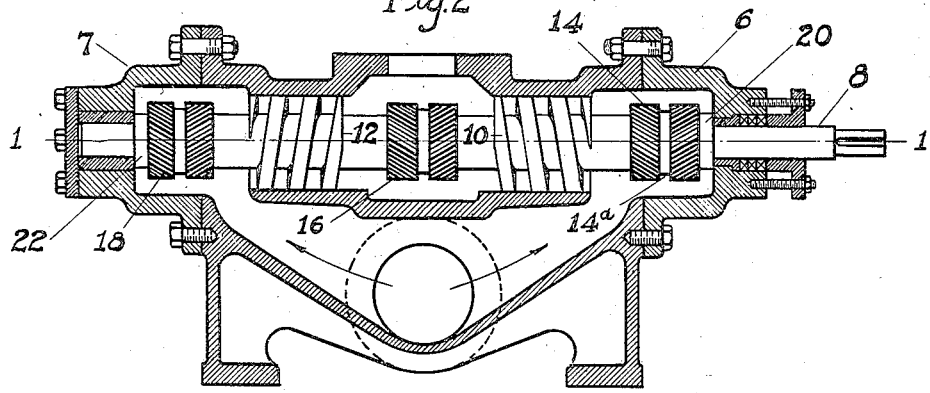
Gilbert Rathman
INVENTOR
BY W. B. Whiting
ATTORNEYS Patented Oct. 11, 1927.

1,645,349

UNITED STATES PATENT OFFICE.

GILBERT RATHMAN, OF NEWARK, NEW JERSEY, ASSIGNOR TO WILLIAM E. QUIMBY, INC., OF NEW YORK, N. Y., A CORPORATION OF NEW YORK.

SCREW PUMP.

Application filed October 10, 1924. Serial No. 742,779.

This invention relates to screw pumps of the type illustrated in Letters Patent No. 529,837, issued on November 27, 1894, to William E. Quimby; and it has for its object to simplify, cheapen and otherwise improve such pumps, more particularly in connection with their use for handling lubricants or other fluids containing matter having the properties of a lubricant.
The Quimby screw pump comprises two pairs of intermeshing screws, right and left and left and right, respectively, mounted in a horizontal plane on parallel shafts to rotate within a shell which is bored to closely fit the perimeters of the unmeshed portions of the screws and is provided in its upper and lower walls with reversible suction and discharge openings communicating respectively with the central space between the two pairs of screws and by lateral passages with its two ends; and as heretofore constructed the two shafts have been extended through stuffing-boxes in at least one head of the shell, geared together outside thereof, and supported in bearings in a standard or standards, while a further extension of one of the shafts, the primary or driven shaft, has either carried a drive pulley or been coupled, directly or through reducing gears, to the shaft of an electric motor. In the larger sizes of pumps, the shafts have also been carried through stuffing-boxes in the other head of the shell and similarly geared together and journaled in standards outside.
By my present invention, which consists, broadly stated, in gearing together the two shafts by gears located within instead of without the casing, as formerly, I have eliminated one of two and in the larger sizes three of the four stuffing-boxes heretofore required and the outside bearings, thereby reducing both leakage and friction, and at the same time have not only effected a great saving in the cost of production but have cut down the overall length of the pump and hence of the space required for its installation— the saving in space being of especial importance in the marine and, particularly, the submarine field, in which the pump is used to a large extent.

A secondary feature of the invention consists in employing, in place of the plain gears heretofore used, special V-toothed gears which are divided centrally by an annular gutter, thus providing an outlet for the fluid which otherwise would be trapped by the intermeshing of the teeth while avoiding any longitudinal thrust on the shafts.

The single pair of gears used in the smaller sizes of pumps may be placed in either end of the casing or in the central chamber, between the pairs of screws, but is preferably located at that end of the casing which adjoins the driven end of the primary shaft. In the larger sizes, one of two pairs of gears is preferably located in the end of the casing adjoining the driven end of the primary shaft and the other pair either at the opposite end of the casing or in the central chamber, while with three pairs of gears one pair is placed in each end and the third at the center of the casing.

The invention is shown, by way of illustration and not of limitation in the accompanying drawings, in which—

Figure 1 is a view, partly in plan and partly in longitudinal horizontal section, of a large-sized Quimby screw pump embodying my improvements, and Fig. 2 is a vertical section through the shell on the line 2 2 of Fig. 1.

As here shown, the usual shell 5 is closed at its ends by the interiorly recessed heads 6 and 7, which extend the interior of the shell and are provided with removable caps. The primary shaft 8 of the pump passes through the head 6, in which it is journaled in a bearing provided by the usual bushing and stuffing-box gland, and at its end is journaled in a bush-bearing set into the head 7 and closed at its outer end by the cap. The second shaft 9 is journaled at both ends in outwardly closed bush-bearings set one into each of the opposite heads. The two shafts, upon which are mounted the usual pairs of intermeshing screws 10 11 and 12 13, are geared together by three pairs of V-toothed gears 14 15, 16 17, and 18 19, with teeth divided centrally by annular gutters 14ª 15ª. The gears 14 15 are mounted between the outer ends of the hollow cores of the screws 10 11 and washers 20 21 bearing against the head 6, the gears 16 17 at the center of the shell between the adjacent ends of the cores of the four screws, and the gears 18 19 between the outer ends of the cores of the screws 12 13 and washers 22 23 bearing against the head 7.

The recessed heads, by providing the extension required for housing the outer pairs of gears, make it possible both to equip old pumps with my improvements and to make new pumps without change in the shells as heretofore constructed. The shell can of course be made longer, if desired, and straight-faced heads can then be used therewith. And if, as in the smaller sizes of pumps, the shafts are geared together with one or two pairs of gears only, a straight-faced head will naturally be used in place of either one or the other or of both of the recessed heads.

My improved pump is self-contained, has a single stuffing-box, runs smoothly and noiselessly in handling a lubricant or fluid providing suitable lubrication, and by reason of its compactness is especially adapted for use in pumping lubricants in submarines and in other places where the space available for its installation is necessarily very restricted.

What I claim as new, and desire to secure by Letters Patent, is—

1. In a screw pump of the type described, a casing comprising a shell with detachable heads adapted as usual to receive two pairs of intermeshing right and left screws and providing the usual suction and discharge openings, two parallel shafts each carrying one of each pair of screws which are journaled one in outwardly closed bearings in the two heads and the other in an outwardly closed bearing in one and in a stuffing box bearing in the other head, and one or more pairs of intermeshing V-toothed gears provided with central annular gutters which are fixed upon and gear together the two shafts within the casing adjoining the ends of the screws.

2. A screw pump of the type described comprising the usual shell and two heads one of which is recessed in its inner face to thereby extend the interior of the shell, two parallel shafts which are journaled one in an outwardly closed and the other in and extending through a stuffing box bearing in the recessed head and both in outwardly closed bearings in the opposite head, intermeshing right and left screws which are mounted upon the shafts, and two intermeshing V-toothed gears provided with central annular gutters which are mounted on and gear together the two shafts within the recessed head.

3. A screw pump of the type described comprising a shell with two heads both interiorly recessed to thereby extend the interior of the shell, two parallel shafts both journaled in outwardly closed bearings in one head and one in an outwardly closed and the other in and extending through a stuffing box bearing in the other head, two pairs of intermeshing right and left screws mounted upon said shafts, and two pairs of intermeshing V-toothed gears provided with central annular gutters respectively mounted and gearing together the two shafts within the two recessed heads of the shell.

4. In a screw pump of the type described the combination, with a shell with detachable heads forming a casing providing suction and discharge openings and mounted in each end thereof a pair of intermeshing right and left screws carried by parallel driving and driven shafts journaled in the casing heads, of one casing head having outwardly closed bearings for both shafts, the other casing head having in its inner face a recess providing an extension of the interior of the casing and an outwardly closed bearing for the driven shaft and a stuffing box bearing for the driving shaft, and a pair of intermeshing gears fixed respectively upon and gearing together the two shafts within the recessed head adjoining the outer ends of one pair of screws.

GILBERT RATHMAN.